United States Patent [19]

Jacob

[11] Patent Number: 5,021,742
[45] Date of Patent: Jun. 4, 1991

[54] LASER AMPLIFIER

[75] Inventor: Jonah H. Jacob, Brookline, Mass.

[73] Assignee: Science Research Laboratory, Inc., Somerville, Mass.

[21] Appl. No.: 246,445

[22] Filed: Sep. 19, 1988

[51] Int. Cl.⁵ .......................... H01S 3/091; H01S 3/04
[52] U.S. Cl. ...................................... 330/4.3; 372/66; 372/93
[58] Field of Search .................... 330/4.3; 372/22, 23, 372/33, 66, 94, 95, 108, 93, 24

[56] References Cited

U.S. PATENT DOCUMENTS

| | | | |
|---|---|---|---|
| 3,467,906 | 9/1968 | Cornely et al. | 330/4.3 |
| 3,513,402 | 5/1976 | Marrison | 372/66 |
| 3,577,093 | 5/1971 | Simpson | 372/66 |
| 3,628,179 | 12/1971 | Cuff | 372/93 |
| 4,001,705 | 1/1977 | Sinclair et al. | 330/4.3 |
| 4,103,179 | 7/1978 | Schmidt | 372/66 |
| 4,498,051 | 2/1985 | Hunter et al. | 372/95 |
| 4,553,244 | 11/1985 | Benedict et al. | 372/188 |

FOREIGN PATENT DOCUMENTS 1570694  7/1980  United Kingdom ................... 372/93

OTHER PUBLICATIONS

Jacob, J. H., "Expanding Beam Concept . . . Laser Amplifiers"; Appl. Phys. Lett., vol. 48, No. 5, pp. 318-320, 2/3/86; abst.
Elov et al.; "Divergence of Radiation . . . Rectilinear Contours", 7/84, Sov. J. Quantum Electron, vol. 14, #7, pp. 769-772,; abst.

Primary Examiner—Nelson Moskowitz
Attorney, Agent, or Firm—Wolf, Greenfield & Sacks

[57] ABSTRACT

This invention relates to a laser amplifier which achieves substantially enhanced gains by diverging the laser beam in a gain medium having a substantially rectangular shape. In particular, at least one laser beam is passed through a lens or other suitable means to cause it to diverge at a predetermined angle and the diverging beam or beams are caused to pass through the gain medium in a manner such that a beam makes only a single pass through any section of the medium, with the total number of passes through the medium by the beam(s) applied to the medium being an even number. The angle at which the beam diverges should be such as to maintain a near optimum laser power extraction efficiency for the beam. If a single beam is supplied to the medium, it makes an even number of passes through the medium with mirrors, prisms, or other suitable means being provided as the beam exits the medium after each pass except the last pass to fold the beam back into the medium for a subsequent pass. The invention operates in a similar manner where two or more laser beams are applied to the medium.

22 Claims, 2 Drawing Sheets

LASER AMPLIFIER

FIELD OF THE INVENTION

This invention relates to laser amplifiers and more particularly to a laser amplifier which achieves substantially enhanced gain by diverging the laser beam in the gain medium while still permitting the gain medium to have a substantially rectangular shape.

BACKGROUND OF THE INVENTION

Many scientific, industrial, medical and military applications require the use of a high power laser beam. The required power is achieved by passing the laser beam at the output from the laser generating oscillator/preamplifier system through a laser power amplifier. However, since conventional laser amplifiers which utilize a laser gain medium having a generally rectangular cross section are not normally capable of achieving a gain in excess of 50 for reasons which will be discussed in greater detail hereinafter, large, complex, and thus relatively expensive oscillator/preamplifier systems are required. The low gain of the amplifiers is a particular problem since the efficiencies of the oscillators/preamplifiers are generally quite low and are inherently much less efficient than the power amplifier for several reasons.

For one thing, oscillators may be required to utilize optical components such as etalons and gratings which are lossy and also significantly decrease the laser extraction efficiency. The oscillator fields also build up from noise and hence the optical pulse length is always shorter than the discharge pulse length. Also, the oscillator gain length is relatively small. Therefore, mirror losses have a relatively larger impact on laser efficiency. Various controls, such as frequency and phase control, are also achieved in the oscillator, further reducing their efficiency.

For these reasons and others, the efficiency of an oscillator may be decreased by factors of 5-10 over that achievable in a carefully designed power amplifier. Therefore, it is desirable to increase the stage gain of the power amplifier as much as possible, preferably to values in the 100 to 500 range, since such increases can result in significant improvements in the size, weight and cost of the overall system.

One potential solution to achieving higher stage gain in a laser amplifier is discussed in a paper entitled "Expanding Beam Concept for Building Very Large Excimer Laser Amplifiers" by J. H. Jacob, M. Rokni, R. E. Klinkowstein and S. Singer (Appl. Phys. Lett. 48(5), Feb. 3, 1986). In this paper, it is postulated that substantially enhanced stage gains can be achieved from a laser amplifier by having the laser beam expand at a relatively small angle, for example, 2°–5°, as the beam passes through the gain medium. This results in the normal stage gain of the amplifier, which is a product of the average gain g of the gain medium and the length L of the gain medium through which the beam traverses, and also results in area gain which is roughly proportional to $A_o/A_i$ where $A_o$ and $A_i$ are the cross-sectional area at the output of the gain medium and the input of the gain medium respectively. Thus, by diverging the laser beam as it passes through the gain medium, improvements in the stage gain by a factor of 10 and more are theoretically achievable, resulting in an amplifier with a stage gain approaching 500, rather than an amplifier with a stage gain of no more than approximately 50.

However, designing the electrodes for a diverging gain medium while still maintaining a constant electric field presents problems. The irregular configuration of the gain medium may also result in inefficient use of the gain medium, may create diffraction problems, and is generally not a preferred configuration. It is therefore desirable to be able to practice the expanding beam concept, and to achieve the improved gain which such concept provides, while still utilizing a rectangular gain medium.

While from the equation for stage gain (g L), it would appear that the stage gain of the gain medium could be increased to any desired level merely by increasing the length (L) of the medium, it has been found that amplified spontaneous emission (ASE) and parasitic modes cannot be controlled for a gain length product (g L) greater than about 4 which corresponds to a stage gain of 50. More particularly, when a laser amplifier is constructed using conventional rectangular geometry and an active medium that has an intrinsic non saturable absorption $\alpha$, the output power does not continually linearly increase as the medium length increases. Instead, the power increases linearly at first; however, when the absorption length product for such an amplifier exceeds 1, the output power stops increasing linearly with increasing length and instead the efficiency (power out/power in) of the laser decreases rapidly.

The reason for the reduction in efficiency arises from the relationship between the change in the effective laser gain along the medium and the non saturable absorption. More particularly, as the optical laser beam passes along the gain medium, the energy intensity or optical flux increases due to stimulated emission. As the flux increases, stimulated emission also increases and more rapidly decreases the population of inversion and hence the incremental gain eventually decreases. However, part of the absorption of the gain medium is non-saturable, and thus the overall gain which is the optical gain less the absorption decreases. Efficiency of extracting photons from the gain medium thus also decreases. Thus, the energy and power output from a laser constructed with conventional rectangular geometry cannot be increased by simply lengthening the gain medium without incurring a severe decrease in efficiency.

For the reasons indicated above, the maximum gain achievable with a normal rectangular gain medium is not greater than approximately 50. However, with the expanding gain medium, the length over which near-optimum power extraction can be obtained is significantly extended, the intensity increase caused by amplification being balanced by the intensity decrease caused by the area expansion. In this manner, the laser power extraction efficiency is maintained near optimum for the entire length of the amplifier. Further the stage gain in an expanding beam amplifier is approximately the product of the average gain times the length of the gain medium multiplied by the area gain. Typically, the product of the average gain times the length of the gain medium is limited to 50 because of ASE. However the multiplication of this number (50) and the area gain of approximately 10 results in stage gains that are an order of magnitude larger than the conventional amplifier.

However, in addition to the problem of designing electrodes for a long expanding beam amplifier, the length of the amplifier can make it difficult to design and cumbersome to use. It would therefore be desirable if the benefits of an expanding beam amplifier could be achieved with a more compact configuration.

It is therefore an object of this invention to provide an improved laser amplifier which is adapted to provide substantially enhanced gain over existing rectangular laser amplifiers while retaining a rectangular configuration.

A further object of this invention is to obtain the benefits of an expanding beam laser amplifier which may be several meters in length with a configuration which is more compact and thus less cumbersome to utilize.

SUMMARY OF THE INVENTION

In accordance with the above, this invention provides a laser amplifier which utilizes an energized gain medium having a generally rectangular shape. At least one laser beam is injected into the medium and means are provided for diverging each of the laser beams. Each beam makes only a single pass through any section of the medium with the total number of passes through the medium by the laser beam or beams passing therethrough being an even number. The angle at which the laser beam or beams applied to the gain medium diverge is such as to maintain a near optimum laser power extraction efficiency for the beam or beams along the entire length of passage through the medium. In the alternative, the angle of divergence may be selected such as to optimize the total gain of the amplifier. Generally, either a single beam is applied to the gain medium, or two beams are applied to the medium and a means is provided for combining the laser beams after their passage through the gain medium. Where two beams are used, they may be applied to opposite faces of the medium, in which case each of the beams makes an odd number of passes through the medium, for example, a single pass through the medium. In the alternative, the two laser beams may be applied to different points on the same face of the gain medium, in which case each beam makes an even number of passes through the medium. Where a single beam is applied to the gain medium, such beam makes an even number of passes through the medium, for example, two passes. As each beam exits the medium after each pass through the medium except the last pass, the beam is folded back into the medium for a subsequent pass. The area over which the beam enters the medium for a subsequent pass each time it is folded back is substantially equal to the area the beam exited the medium during the preceeding pass.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
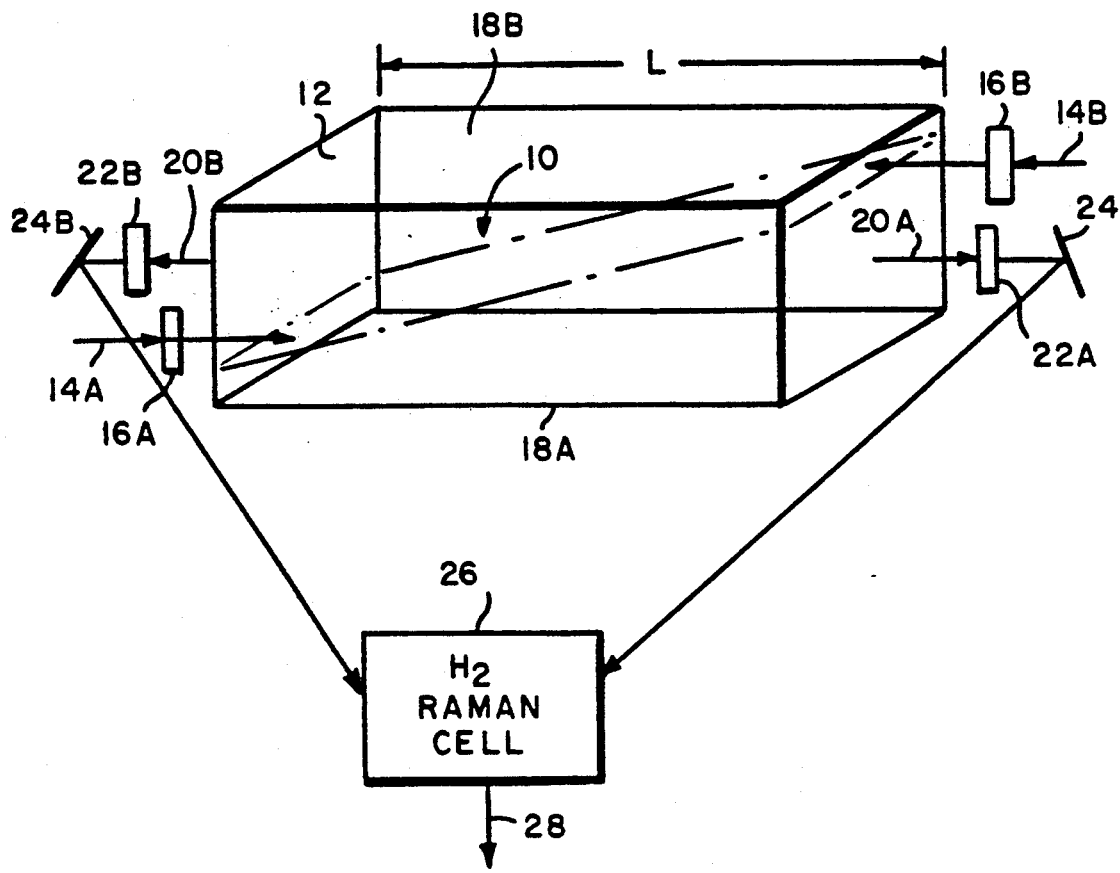
FIG. 1 is a semi-schematic perspective view of a laser amplifier in accordance with a first embodiment of the invention.

Referring to FIG. 1, a laser gas medium 10 is shown which medium is enclosed in a rectangular container 12. For purposes of the present discussion, it will be assumed that the gain medium consists of a gas or mixture of gases of a type which is currently utilized for such mediums. The gas may be at near atmospheric pressure or may be pressurized. It is pumped by high-energy electron beams in a conventional fashion, and gas may also be pumped through the container 12 in conventional fashion for cooling purposes and to eliminate acoustical waves.

In FIG. 1, two laser beams 14A and 14B are shown, each of which is applied through a diverging lens 16 to an opposite face of container 12. The beams 14A and 14B may be obtained from separate oscillator/preamplifier systems, but are preferably obtained from the same oscillator/preamplifier, the output from such oscillator/preamplifier being optically split to form the two beams 14A and 14B.

Diverging lenses 16 cause each of the beams 14 to diverge at a slight angle as they are applied to opposite faces of the container 12 for gain medium 10. In FIG. 1, the gain medium is shown divided into two wedge shaped sections 18A and 18B by phantom lines. However, this division exists only because of the optical path of the laser beam through the medium 10 and not because of any actual physical separation in the medium. Thus, the beam 14A passes through the wedge-shaped portion 18A of the gain medium where it diverges and exits as an amplified beam 20A. Similarly, the laser beam 14B diverges through the area 18B of the gain medium and exits the medium as an amplified beam 20B. The output beams 20A and 20B are passed through collimating lenses 22A and 22B respectively to mirrors 24A and 24B. The mirrors 24 direct each of the beams as an input to a hydrogen Raman cell 26 which is operative to combine the two output beams 20 to form a single amplified output beam 28. Raman cell 26 is a standard hydrogen cell which accepts laser photon inputs and re-emits the photons a somewhat lower energy level and at a longer wavelength. The embodiment of FIG. 1 is thus useful when an output is desired at a wavelength which is longer than the wavelength of the oscillator being utilized to generate the laser.

The angle at which the laser beams 14 diverge is typically quite small. The angle, which may, for example, be in the range of 0.5° to 10°, is selected so that near-optimum power extraction can be obtained over substantially the entire length (L) through which the beam traverses in the medium. This result is achieved by expanding the beam so that the intensity increase caused by amplification is balanced by the intensity decrease caused by the area expansion. For a given area along the path of the laser beam through the medium 10, the following equation applies:

$$\frac{d\psi}{dx} = \frac{g_0\psi}{1 + \psi/A} = \alpha\psi \tag{1}$$

where:
$\psi$ = the power at the given point,
A = the beam cross sectional area at the point,
$g_0$ = the small signal gain of the medium, and
$\alpha$ = the nonsaturable absorption coefficient of the medium.

Equation (1) can be solved for a given set of gain medium parameters and from these results, the area expansion ratio $A_o/A_i$ which maximizes the extraction efficiency for a given length (L) can be determined. The area expansion ratio in turn determines the beam diversion angle. The objective in each instance is to maximize the gain output from the amplifier.

Figure 2:
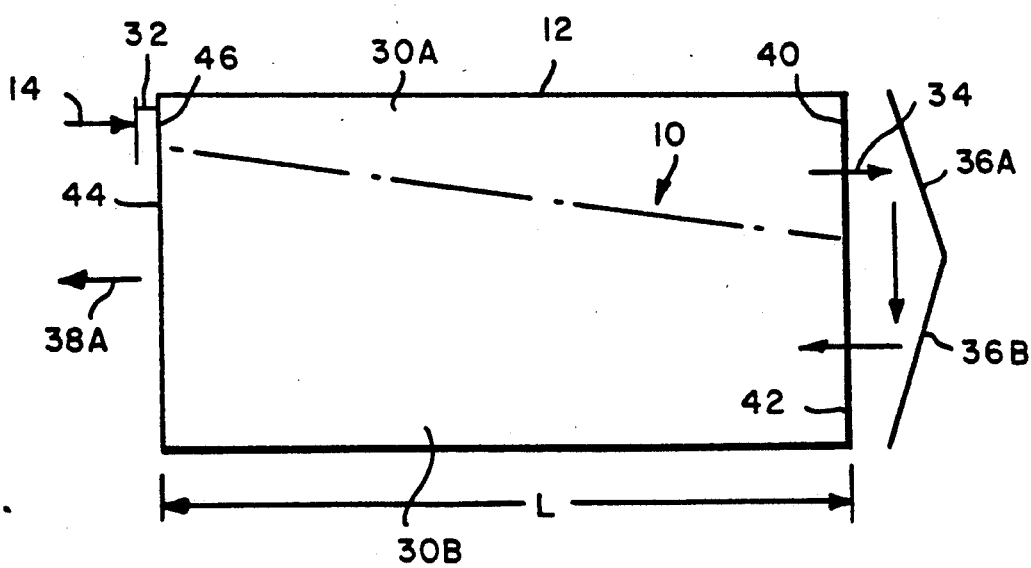
FIG. 2 is a representative side view of a laser amplifier of a second embodiment of the invention.

For the embodiment of the invention shown in FIG. 1, the two wedge-shaped sections 18A and 18B are identical and separate laser beams 14A and 14B each make a single pass through the gain medium 10. FIG. 2 illustrates an alternative embodiment of the invention wherein only a single laser beam 14 is applied to the laser gain medium, the laser gain medium is effectively divided into two sections 30A and 30B of unequal size, and the beam is folded back so as to make two passes through the gain medium. More particularly, the beam 14 is applied to a narrow slot 32 which diffracts the beam to achieve the desired diversion angle. The angle at which diffraction occurs is approximately equal to the beam wavelength divided by the width of the slit. Thus, for a known beam wavelength, a desired angle of divergence can be achieved by suitably adjusting the width of the slit 32.

The diverging beam out of slit 32 is applied to a point near the top of the left side of container 12 and diverges through area 30A of the gain medium. The output from area 30A is a beam 34 which has been amplified. This beam is applied to a mirror 36A of a pair of mirrors (36A, 36B) which are mounted at a substantially right angle to each other. The beam 34 is reflected off of mirror 36A to mirror 36B and off of mirror 36B into area 30B of the gain medium. At this point the beam is still diverging and continues to diverge as it passes through area 30B, the output beam 38 being a substantially amplified version of the input beam 14.

With the embodiment of FIG. 2, the cross section area 40 at the output from portion 30A of the gain medium is substantially the same as the cross section area 42 at the input to portion 30B. To insure this, one or both of the mirrors 36A, 36B may have to be cylindrical in shape to compensate for the continued expansion of the laser beam as it propagates from the cross section area 40 to the cross section area 42. Thus, the configuration shown in FIG. 2 is basically a wedge-shaped diverging gain medium of length 2(L) which is folded at its midpoint into a rectangular configuration. The gain for this configuration is substantially equal to the average gain (g2L) times the area gain $A_o/A_i$ where $A_o$ is the cross section area of face 44 and $A_i$ is the cross section area of face 46.

Thus, a laser amplifier is provided which is capable of producing substantially enhanced gain over standard rectangular amplifier configurations while still offering the design advantages and packaging convenience of such a configuration.

Figure 3:
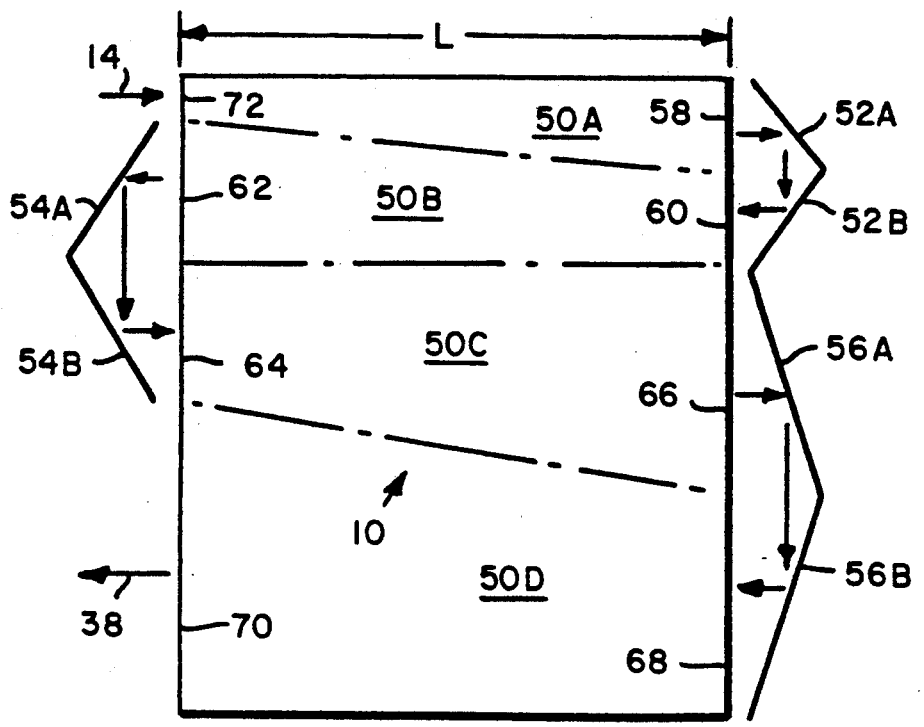
FIG. 3 is a representative side view of a laser amplifier of third embodiment of the invention.

FIG. 3 shows another embodiment of the invention wherein the laser beam 14 which has been diverged by a lens, slit, or other suitable means, makes four passes through the gain medium of length L before exiting as output beam 38. During each pass through the medium 10, the beam passes through and diverges in a different section of the medium 50A-50D, which sections are shown divided by phantom lines in FIG. 3. Again, it should be emphasized that it is the coherence of the laser beam which restricts the beam during each pass through the indicated area and that there are in fact no physical barriers within the medium, the medium being merely a laser gain medium contained within a rectangular configuration. With the configuration shown in FIG. 3, the laser beam 14 enters the medium in the upper lefthand portion thereof, diverges through section 50A, is reflected back into section 50B by mirrors 52A and 52B, continues to diverge through region 50B of the medium, is reflected back into region 50C by mirrors 54A and 54B, diverges through region 50C, is diverted back into region 50D by mirrors 56A and 56B and exits the medium on the lefthand side of region 50D. The beam thus makes an even number (i.e., four) passes through the gain medium. With this embodiment of the invention, the faces 58 and 60 have substantially the same cross-section area as do the faces 62 and 64, and the faces 66 and 68. Thus, the configuration shown in FIG. 3 is equivalent to a single diverging laser amplifier having a length equal to 4L. The design shown in FIG. 3 can provide a gain equal to the average gain times the gain length 4L, and this gain is multiplied by the area gain which is proportional to the area of face 70 divided by the area of face 72. The configuration of FIG. 3 can thus provide significant gains (in the order of 100 to 500) while still maintaining a compact configuration.

Figure 4:
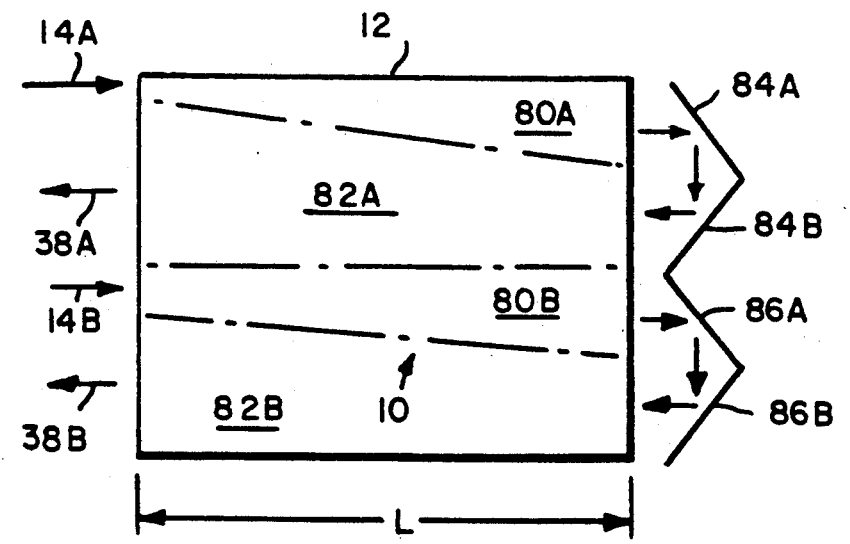
FIG. 4 is a representative side view of a laser amplifier of a fourth embodiment of the invention.

FIG. 4 shows still another embodiment of the invention wherein, like the embodiment of FIG. 1, two input beams 14A and 14B are applied to the gain medium 10. However, for this embodiment of the invention, both beams are applied at different points along the same side of the medium, and each beam makes two passes through the medium before exiting, rather than only a single pass as for the embodiment of the invention shown in FIG. 1. Beam 14A enters region 80A of the medium is reflected back into region 82A by mirrors 84A and 84B, and exits on the left side of region 82A as beam 38A. Similarly, beam 14B enters on the left side of region 80B, is reflected back into region 82B by mirrors 86A and 86B, and exits on the left side of region 82B as amplified beam 38B. The configuration shown in FIG. 4 is thus basically a double version of the configuration shown in FIG. 2. As for the embodiment shown in FIG. 1, the beams 14A and 14B may originate from separate oscillators, but are preferably obtained by dividing the output from a single oscillator. Outputs 38A and 38B may be used separately, or may be combined by use of an H2 Raman cell 26 (FIG. 1) or other suitable means.

While four different configurations have been shown in the figures, it is apparent that the teachings of this invention may be utilized with either a single laser beam being folded back an even number of times through the gain medium, so that the result is an efficiently utilized rectangular gain medium, or two or more beams may be passed through the medium in a manner such that only a single beam makes a single pass through any region of the medium at a given time and the total number of passes through the medium by the beams is an even number. It is important that the beams not overlap in the media, since this may cause acoustic noise as a result of uneven heating of the media and other problems. The even number of passes assures efficient use of the rectangular gain media.

While for the preferred embodiments discussed above it has been assumed that the gain medium utilized is a gaseous medium, it is apparent that the teachings of this invention could also be employed utilizing a solid medium or any other laser gain medium. Further, while mirrors have been illustrated to reflect the beam back into the gain medium after each time the beam makes a pass except the last time, a prism or other suitable means for accomplishing this reflecting function could be utilized in place of mirrors. Further, while two means have been disclosed for diverging the beam, other suitable means could be utilized.

Thus, while the invention has been particularly shown and described above with respect to preferred embodiments, it will be apparent that the foregoing and other changes in form and detail can be made therein by one skilled in the art without departing from the spirit and scope of the invention.

What is claimed is:

1. A laser amplifier comprising:
    an energized laser gain medium, said medium having a substantially rectangular shape;
    means for applying at least one laser beam to said gain medium;
    means for diverging each laser beam applied to said medium said beam continuing to diverge as it passes through the medium; said beam continuing to diverge as it passes through the medium and
    means for causing the at least one beam to make only a single pass through and section of said medium with the total number of passes through the medium by the at least one beam being an even number.

2. A laser amplifier as claimed in claim 1 wherein the angle at which said at least one beam diverges is such as to maintain a near optimum laser power extraction efficiency for the at least one beam along the entire length of its passage through the medium.

3. A laser amplifier as claimed in claim 1 wherein the angle at which said at least one beam diverges is such as to optimize the total gain of the amplifier.

4. A laser amplifier as claimed in claim 1 wherein two laser beams are applied to said gain medium; and
    including means for combining the laser beams after their passage through the gain medium.

5. A laser amplifier as claimed in claim 4 wherein said means for combining alters the wavelength of the laser beam.

6. A laser amplifier as claimed in claim 4 wherein said means for combining is a hydrogen cell.

7. A laser amplifier as claimed in claim 1 wherein two laser beams are applied to said gain medium, wherein said two laser beams are applied to opposite faces of said medium, and wherein each of said beams makes an odd number of passes through the medium.

8. A laser amplifier as claimed in claim 7 wherein each of said beams makes a single pass through the medium.

9. A laser amplifier as claimed in claim 1 wherein two laser beams are applied to said gain medium, wherein said two laser beams are applied to different points on the same face of said gain medium, and wherein each of said beams makes an even number of passes through said medium.

10. A laser amplifier as claimed in claim 1 wherein a single laser beam is applied to said gain medium, and wherein said beam makes an even number of passes through the medium.

11. A laser amplifier as claimed in claim 10 wherein said beam makes two passes through said medium.

12. A laser amplifier as claimed in claim 10 including means operative as the beam exits the medium after each pass except the last pass for folding the beam back into the medium for a subsequent pass.

13. A laser amplifier as claimed in claim 12 wherein the area over which the beam enters the medium for a subsequent pass each time it is folded back is substantially equal to the area the beam exited the medium during the preceeding pass.

14. A laser amplifier as claimed in claim 12 wherein said means for folding back includes reflective means for causing said beam to enter the medium at a selected area on the same face as the beam exited and at an angle substantially 180 degrees to the angle at which it exited.

15. A laser amplifier as claimed in claim 14 wherein said reflective means includes a prism.

16. A laser amplifier as claimed in claim 14 wherein said reflective means includes a pair of mirrors.

17. A laser amplifier as claimed in claim 1 including means operative as each beam exits the medium after each pass except the last pass for folding the beam back into the medium for a subsequent pass.

18. A laser amplifier as claimed in claim 17 wherein the area over which a beam enters the medium for a subsequent pass each time it is folded back is substantially equal to the area the beam exited the medium during the preceding pass.

19. A laser amplifier as claimed in claim 1 wherein said means for diverging includes a diverging lens.

20. A laser amplifier as claimed in claim 1 wherein said means for diverging includes a defraction slit.

21. A laser amplifier as claimed in claim 1 wherein the angle at which the beam diverges is such that the rate of increase in the cross-sectional area of a beam as it passes through the medium relates to the incremental gain of the medium so that the photon flux density in the medium remains substantially constant along the length of all passes of the beam through the medium.

22. A method of amplifying one or more laser beams comprising the steps of:
    applying said one or more laser beams to an energized gain medium having a substantially rectangular shape;
    causing the at least one beam to make only a single pass through any section of said medium with the total number of passes through the medium by the at least one beam being an even number; and
    diverging the laser beam applied to and passing through the medium at an angle such as to maintain a near optimum laser power extraction efficiency for the at least one beam along the entire length of its passes through the medium.

* * * * *